(12) United States Patent
Benevelli

(10) Patent No.: US 10,696,157 B2
(45) Date of Patent: Jun. 30, 2020

(54) TRANSMISSIONS SYSTEM

(71) Applicant: CNH Industrial America LLC, New Holland, PA (US)

(72) Inventor: Alessandro Benevelli, Albinea (IT)

(73) Assignee: CNH Industrial America LLC, New Holland, PA (US)

(*) Notice: Subject to any disclaimer, the term of this patent is extended or adjusted under 35 U.S.C. 154(b) by 79 days.

(21) Appl. No.: 16/072,836

(22) PCT Filed: Jan. 24, 2017

(86) PCT No.: PCT/EP2017/051443
§ 371 (c)(1),
(2) Date: Jul. 25, 2018

(87) PCT Pub. No.: WO2017/129571
PCT Pub. Date: Aug. 3, 2017

(65) Prior Publication Data
US 2019/0031025 A1 Jan. 31, 2019

(30) Foreign Application Priority Data
Jan. 25, 2016 (IT) .............................. 102016006774

(51) Int. Cl.
*F16H 61/4061* (2010.01)
*B60K 17/28* (2006.01)
(Continued)

(52) U.S. Cl.
CPC .............. *B60K 17/28* (2013.01); *F16H 1/28* (2013.01); *F16H 39/04* (2013.01); *F16H 47/04* (2013.01);
(Continued)

(58) Field of Classification Search
CPC .. F16H 61/4061; F16H 61/4078; F16H 61/47; F16H 47/04
See application file for complete search history.

(56) References Cited

U.S. PATENT DOCUMENTS 3,990,235 A * 11/1976 Bauchet .................. B60K 6/12
60/413
4,399,653 A * 8/1983 Pylat, Jr. ............... F15B 11/048
60/327

(Continued)

FOREIGN PATENT DOCUMENTS

EP 0227547 7/1987
EP 2949497 12/2015

OTHER PUBLICATIONS

International Search Report and Opinion dated Mar. 30, 2017 for related International Application No. PCT/EP2017/051443 (11 pages).

(Continued)

*Primary Examiner* — David R Morris
(74) *Attorney, Agent, or Firm* — Richard Demille; Peter Zacharias

(57) ABSTRACT

A transmission system includes a power take-off for driving an implement and a hydrostatic unit for transmitting power from the engine to the power take-off. The hydrostatic unit includes a first hydraulic power unit having a first connection line and a second connection line, and a second hydraulic power unit having a first connection line and a second connection line. The hydrostatic unit also includes a valve for connecting the first hydraulic power unit and the second hydraulic power unit, the valve being positionable at least in a first position, in a second position and in a neutral position.

11 Claims, 6 Drawing Sheets

(51) Int. Cl.
  *F16H 61/4078* (2010.01)
  *F16H 61/47* (2010.01)
  *F16H 47/04* (2006.01)
  *F16H 1/28* (2006.01)
  *F16H 39/04* (2006.01)
  *F16H 57/04* (2010.01)
  *F16H 61/433* (2010.01)
  *F16H 61/439* (2010.01)
  *F16H 37/08* (2006.01)

(52) U.S. Cl.
  CPC ..... *F16H 57/0486* (2013.01); *F16H 61/4061* (2013.01); *F16H 61/4078* (2013.01); *F16H 61/433* (2013.01); *F16H 61/439* (2013.01); *F16H 61/47* (2013.01); *F16H 2037/0886* (2013.01)

(56) References Cited

U.S. PATENT DOCUMENTS

| | | | | |
|---|---|---|---|---|
| 6,182,448 | B1 * | 2/2001 | Ohkura | F16H 61/4026 60/445 |
| 7,354,369 | B2 * | 4/2008 | Hasegawa | B60K 5/00 475/72 |
| 9,233,607 | B2 * | 1/2016 | Huber | B60W 30/1888 |
| 9,333,858 | B2 * | 5/2016 | Huber | B60W 30/1888 |
| 9,446,664 | B2 * | 9/2016 | Huber | B60W 30/1888 |
| 10,087,960 | B2 * | 10/2018 | Wagers | F16H 61/421 |
| 2007/0249455 | A1 * | 10/2007 | Hasegawa | B60K 5/00 475/78 |
| 2014/0026691 | A1 * | 1/2014 | Huber | B60W 30/1888 74/15.86 |
| 2014/0033838 | A1 * | 2/2014 | Huber | B60W 30/1888 74/15.86 |
| 2014/0039756 | A1 * | 2/2014 | Huber | B60W 30/1888 701/36 |
| 2016/0252109 | A1 * | 9/2016 | Wagers | F16H 61/421 60/327 |
| 2018/0370355 | A1 * | 12/2018 | Benevelli | B60K 17/28 |

OTHER PUBLICATIONS

Italian Search Report dated Sep. 29, 2016 for related Italian Application No. 102016000006774 (6 pages).

* cited by examiner

TRANSMISSIONS SYSTEM

CROSS REFERENCE TO RELATED APPLICATIONS

This application is a US National Stage filing of International Application Serial No. PCT/EP2017/051443 entitled "A TRANSMISSION SYSTEM," filed Jan. 24, 2017, which claims priority to Italian Application Serial No. 102016000006774, filed Jan. 25, 2016, each of which is incorporated by reference herein in its entirety for all purposes.

The invention relates to a transmission system for transmitting power generated by an engine to a power take-off (PTO) of a vehicle, particularly an industrial or agricultural vehicle such as a tractor.

Known tractors comprise an internal combustion engine and a transmission system for transmitting power from the engine to wheels or tracks of the tractor. Downstream of the transmission system, a power-take off is normally provided. One or more implements can be connected, if desired, to the power take-off so as to receive power from the engine through the transmission system.

In known tractors, the power take-off is connected to the engine by means of a transmission consisting only of mechanical gears. As a consequence, the speed of an output shaft of the power take-off is always proportional to the engine speed.

However, in many cases it is desirable that the speed of the output shaft of the power take-off can be made independent of the engine speed, and in particular that the speed of the output shaft of the power take-off can be continuously varied independently of the engine speed.

A number of solutions have been thought in order to obtain this result, as disclosed in WO 2012/110615. In particular, some of these solutions use a hydrostatic unit interposed between the engine and the power take-off in order to make the speed at the power take-off independent of the engine speed.

in said first position, the first connection line and the second connection line of the first hydraulic power unit are connected respectively to the first connection line and to the second connection line of the second hydraulic power unit, in said second position, the first connection line and the second connection line of the first hydraulic power unit are connected respectively to the second connection line and to the first connection line of the second hydraulic power unit, in said neutral position, the first hydraulic power unit is disconnected from the second hydraulic power unit.

Owing to the invention, both the first hydraulic power unit and the second hydraulic power unit can act either as a hydraulic pump or as a hydraulic motor.

Thus, the first hydraulic power unit can be a variable displacement pump having a displacement which can vary between zero and a maximum value, so as to provide a hydraulic ratio that can range from zero to a positive upper threshold. In order to obtain negative hydraulic ratios, the valve is switched to the second position, so that the pump works as a motor.

As a consequence, the first hydraulic pump can be a variable displacement piston pump, for example a radial piston pump having a reduced eccentricity.

This makes it possible to obtain a transmission system having a compact and simple structure, which can be installed on existing vehicles in place of known transmission systems without requiring consistent constructional changes.

In an embodiment, a planetary gear train can be provided upstream of the power take-off.

Owing to this embodiment, power generated by the engine is combined with power generated by, or absorbed by, the hydrostatic unit, thereby allowing the power take-off to be driven at a speed which is continuously variable between a minimum value and a maximum value.

In an embodiment, the hydraulic pump is so controlled as to set displacement of the hydraulic pump to a nil value, when displacement of the hydraulic pump drops until reaching a preset minimum value.

Similarly, the hydraulic pump is so controlled that, when it is requested that displacement of the hydraulic pump increases from zero to a positive value, displacement of the hydraulic pump is kept to a nil value, until when a preset minimum displacement is required.

This makes the transmission system particularly stable.

In an embodiment, the valve is so controlled that, if it has to pass from the first position to the second position at a preset value of engine speed, the valve is displaced to the second position at an engine speed greater than said preset value.

Similarly, if the valve has to pass from the second position to the first position at said preset value of the engine speed, the valve is switched to the first position at an engine speed lower than said preset value.

A cycle of hysteresis is thus generated, which further increases system stability.

The invention will be better understood and carried out with reference to the attached drawings, that show an exemplifying and non-limiting embodiment thereof, in which.

Figure 1:
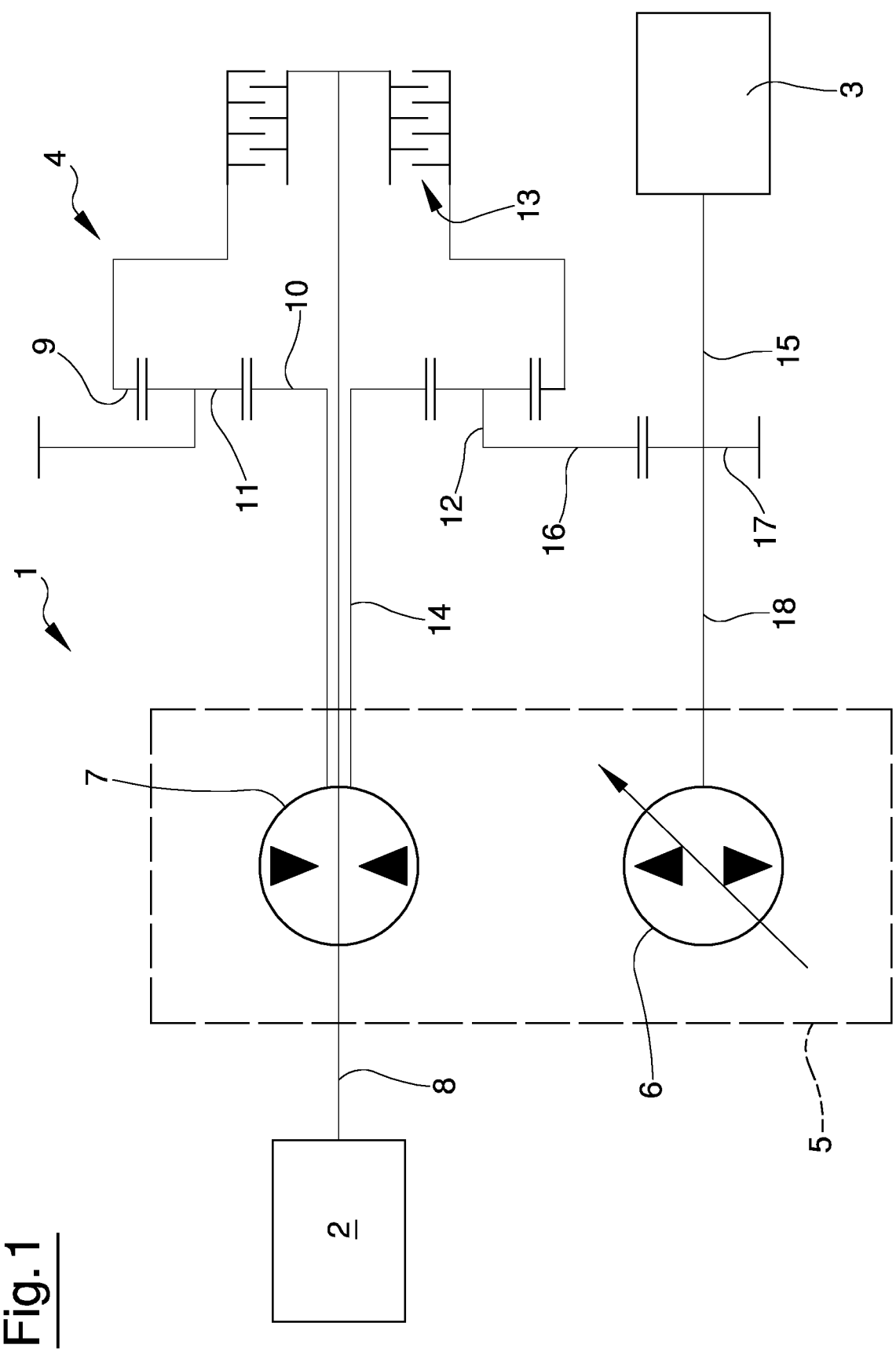
FIG. 1 is a schematic view showing a transmission system of a vehicle.

FIG. 1 shows schematically a transmission system 1 of a vehicle, particularly an industrial or agricultural vehicle such as a tractor. The transmission system 1 allows power to be transmitted from an engine 2, particularly an internal combustion engine, to a plurality of wheels or tracks of the vehicle, that are not shown in the drawings.

The transmission system 1 further allows power to be transmitted to a power take-off 3, in order to drive one or more implements that can be connected to the power take-off 3.

The transmission system 1 comprises a planetary gear train 4, interposed between the engine 2 and the power take-off 3.

The planetary gear train 4 may comprise an annular gear 9 and a sun gear 10. A plurality of planet gears 11 are interposed between the annular gear 9 and the sun gear 10. The planet gears 11 are supported by a carrier 12.

The transmission system 1 further comprises a hydrostatic unit 5, arranged between the engine 2 and the power take-off 3. The hydrostatic unit 5 comprises a first hydraulic power unit, particularly conformed as a hydraulic pump 6, and a second hydraulic power unit, particularly conformed as a hydraulic motor 7.

The transmission system 1 comprises a first input shaft 8, that is coupled to the engine 2, for example by means of a known joint, so as to be driven by the engine 2.

The first input shaft 8 is couplable to the planetary gear train 4, for example by means of a clutch 13. In particular, the first input shaft 8 is couplable to the annular gear 9 of the planetary gear train 4, so that the engine 2 may drive the annular gear 9.

The transmission system 1 further comprises a second input shaft 14, that can be connected to the hydraulic motor 7. The second input shaft 14 is couplable to the sun gear 10 of the planetary gear train 4, so that the hydraulic motor 7 may drive the sun gear 10. In particular, the second input shaft 14 can be directly coupled to the sun gear 10.

The first input shaft 8 and the second input shaft 14 can be coaxial. In particular, the first input shaft 8 and the second input shaft 14 can be arranged one inside the other. In the example shown, the first input shaft 8 is arranged inside the second input shaft 14, which is hollow. A particularly compact structure can therefore be obtained.

The transmission system 1 further comprises an output shaft 15 that can be coupled to the power take-off 3. The output shaft 15 allows the power take-off 3 to be connected to the planetary gear train 4. To this end, the carrier 12 can support a first gear 16, which meshes with a second gear 17 fixed relative to the output shaft 15. The first gear 16 and the second gear 17 act as a gear assembly connecting the planetary gear train 4 to the output shaft 15. Owing to the above mentioned gear assembly, the desired transmission ratio can be obtained at the output shaft 15.

The hydraulic pump 6 has a shaft 18 which is connected to the output shaft 15. The shaft 18 is fixed relative to the output shaft 15. In the example shown, the shaft 18 is coaxial with the output shaft 15.

In an embodiment, the output shaft 15 can be integral with the shaft 18, i.e. the output shaft 15 and the shaft 18 can be one and the same shaft.

In operation, the clutch 13 is engaged when it is desired to transmit power to the power take-off 3. Through the clutch 13, power is transmitted from the first input shaft 8 (i.e. from the engine 2) to the annular gear 9 of the planetary gear train 4. The planetary gear train 4 also receives power from the hydraulic motor 7, through the second input shaft 14 driving the sun gear 10. The motion of the planet gears 11 derives from the combination of rotations transmitted by the annular gear 9 and the sun gear 10. From the planet gears 11, motion is transmitted to the second gear 17 through the carrier 12 and the first gear 16. The output shaft 15, which is fixed relative to the second gear 17, is thus rotatingly driven. The output shaft 15 in turn transmits motion to the power take-off 3.

The transmission system 1 is a continuously variable transmission (CVT) that allows the output speed to be continuously varied between a minimum value and a maximum value.

Owing to the transmission system 1, the speed of the output shaft 15, i.e. the speed at the power take-off 3, is no longer proportional to the engine speed.

Both the hydraulic pump 6 and the hydraulic motor 7 can be of the radial piston type. Thus, the hydrostatic unit 5 can have a particularly compact structure, because radial piston pumps and motors have reduced dimensions if compared to other kinds of pumps and motors.

The hydraulic pump 6 can be a variable displacement pump. In particular, displacement of the hydraulic pump 6 can be varied between zero and a positive maximum value.

The hydraulic motor 7 can be a fixed displacement motor.

Figure 2:
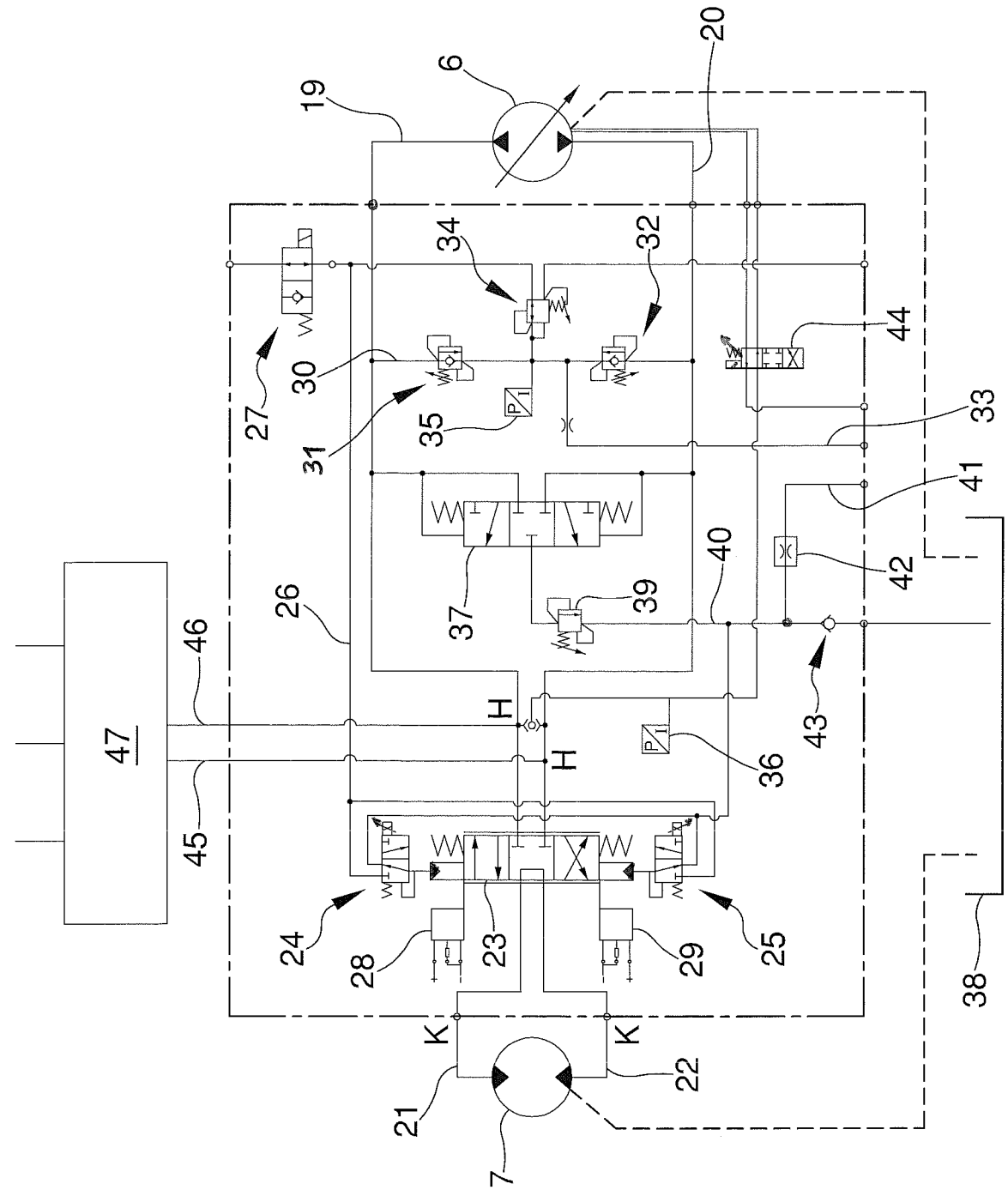
FIG. 2 is a schematic view showing a hydraulic circuit associated with the transmission system of FIG. 1.

In order to obtain negative transmission ratios of the hydrostatic unit, the hydraulic pump 6 and the hydraulic motor 7 can be included in the circuit shown in FIG. 2.

The hydraulic pump 6 has a first connection line 19 and a second connection line 20 which allow the hydraulic pump 6 to be connected to other components of the circuit. Similarly, the hydraulic motor 7 has a first connection line 21 and a second connection line 22.

A directional control valve 23 or cross-valve is interposed between the hydraulic pump 6 and the hydraulic motor 7. The directional control valve 23 may be a 4-way 3-position valve.

The directional control valve 23 has a distributor element or spool that is positionable in a first position P1 or direct flow position, in which the first connection line 21 of the hydraulic motor 7 is connected to the first connection line 19 of the hydraulic pump 6, and the second connection line 22 of the hydraulic motor 7 is connected to the second connection line 20 of the hydraulic pump 6. In the first position P1, the hydraulic pump 6 receives mechanical energy from the hydraulic motor 7 and converts it into hydraulic energy. In other words, in the first position P1 the hydraulic pump 6 acts as a pump and is driven by the hydraulic motor 7, which works as a motor.

The distributor element of the directional control valve 23 further has a second position P2 or crossed flow position, in which the first connection line 21 of the hydraulic motor 7 is connected to the second connection line 20 of the hydraulic pump 6, and the second connection line 22 of the hydraulic motor 7 is connected to the first connection line 19 of the hydraulic pump 6. In the second position P2, the hydraulic pump 6 transmits mechanical energy to the hydraulic motor 7 which converts it into hydraulic energy. In other words, in the second position P2 the hydraulic pump 6 acts as a motor and drives the hydraulic motor 7, which works as a pump.

Finally, the distributor element of the directional control valve 23 can be positioned in a central position P3 or neutral position in which the hydraulic pump 6 is isolated from the hydraulic motor 7. In particular, in the central position P3 the first connection line 21 of the hydraulic motor 7 is connected to the second connection line 22 of the hydraulic motor 7. Furthermore, in the central position P3 the connection lines 19, 20 of the hydraulic pump 6 are both closed and are not connected to any other component.

In order to minimize pressure drop through the directional control valve 23, the distributor element of the directional control valve 23 has relatively large dimensions. A first piloting valve 24 and a second piloting valve 25 are therefore provided to control position of the distributor element of the directional control valve 23.

The first piloting valve 24 and the second piloting valve 25 are connectable by means of an input line 26 to a supply circuit of the vehicle which supplies pressurized fluid in order to operate the piloting valves 24, 25. The supply circuit to which the input line 26 is connectable can comprise a boost line of the vehicle, particularly in case the latter is a tractor.

The input line 26 is connectable to the supply circuit by means of a valve 27 which can be of the on-off type. In other words, the valve 27 can be positioned in a first configuration in which the input line 26 is in direct fluid communication with the supply circuit, or in a second configuration in which fluid cannot flow from the supply circuit towards the input line 26.

The valve 27 can be positioned in the second configuration when the power take-off 3 is not working. By so doing, when the power take-off 3 is not working the hydrostatic unit 5 can be isolated from the supply circuit, thereby allowing power to be saved.

The circuit shown in FIG. 2 further comprises a first position sensor 28 and a second position sensor 29 associated with the directional control valve 23. The first position sensor 28 and the second position sensor 29 have the purpose of determining the position of the distributor element of the directional control valve 23, in order to establish whether the latter is in the first position $P_1$, in the second position P2 or in the central position P3. The position sensors 28, 29 can be proximity sensors.

A first pressure control valve 31 and a second pressure control valve 32 are provided to control pressure along the first connection line 19 and the second connection line 20 of the hydraulic pump 6. In particular, the first pressure control valve 31 and the second pressure control valve 32 can be located along a joining line 30 which joins the first connection line 19 and the second connection line 20 of the hydraulic pump 6 to one another. The first pressure control valve 31 and the second pressure control valve 32 are configured to reach an open position when pressure in the first connection line 19 and in the second connection line 20 overcomes a preset upper threshold. When pressure in the first connection line 19 or in the second connection line 20 reaches the preset upper threshold, the first pressure control valve 31 or respectively the second pressure control valve 32 connect the respective connection line to a discharge line 33.

A relief valve 34 can be provided to limit pressure in the fluid which enters the circuit through the valve 27, particularly fluid coming from the boost line of the tractor. The relief valve 34 can also limit possible pressure peaks which might arise in the circuit during operation.

In an alternative embodiment, the discharge line 33 can be closed and the relief valve 34 can be used to keep pressure in the first connection line 19 and in the second connection line 20 below a preset upper threshold.

A pressure sensor 35 is provided to measure pressure of the fluid entering the circuit through the valve 27, particularly fluid coming from the boost line of the tractor. A further pressure sensor 36 allows to monitor the maximum pressure in the circuit. Signals coming from the pressure sensor 35 and from the further pressure sensor 36 can be processed for diagnostic purposes.

A flashing valve 37 is interposed between the first connection line 19 and the second connection line 20 of the hydraulic pump 6. The flashing valve 37 allows the line having the lowest pressure (selected from between the first connection line 19 and the second connection line 20) to be connected to a discharging tank 38. Thus, it is avoided that the fluid reaches an excessive temperature inside the circuit, so that the fluid can perform a temperature conditioning function.

A pressure reduction valve 39 can be located downstream of the flashing valve 37 along a conduit 40 which connects the flashing valve 37 to the discharging tank 38.

A portion of fluid passing through the conduit 40 may be deviated into a lubricating conduit 41, and be subsequently used for lubricating the toothed wheels of the planetary gear train 4. An orifice 42 is provided along the lubricating conduit 41. A check valve 43 is located along the conduit 40 downstream of the lubricating conduit 41, in order to keep constant pressure of the lubricating fluid.

A pump control valve 44 is provided to control displacement of the hydraulic pump 6. The input to the pump control valve 44 is the highest pressure in the circuit shown in FIG. 2, which enters the pump control valve 44 for example by means of a shuttle valve which is not shown. If the pump control valve 44 is not activated or if no fluid pressure is available, then the hydraulic pump 6 stays in a zero displacement condition.

Two sensors which are not shown, particularly angle sensors, may be provided to detect displacement of the hydraulic pump 6.

Along the first connection line 19 and the second connection line 20 of the hydraulic pump 6, respective joining ports H can be defined, for connecting the first connection line 19 and the second connection line 20 with an input line 45 and an output line 46 connected to an auxiliary distributor, for example a back distributor 47 of the vehicle, which can supply hydraulic fluid and hence power.

When the directional control valve 23 is in the central position P3, the hydraulic motor 7 is isolated from the hydraulic pump 6.

The hydraulic pump 6 is connected to the back distributor 47 and works as a motor controlled by the back distributor 47.

The clutch 13 can be disengaged, so that the planetary gear train 4 is isolated from the hydrostatic unit 5 and from the power take-off 3.

Hence, the power take-off 3 is driven directly by the hydraulic pump 6, which as already explained works as a motor.

This functionality can be called "hydraulic direct drive functionality".

The back distributor 47 is a proportional distributor and the flow rate of the fluid coming from the back distributor 47 can be precisely controlled. Hence, the speed $n_{PTO}$ at the power take-off 3 can be controlled as desired, provided that power at the power take-off 3 does not exceed the maximum power that can be supplied by the back distributor 47, which is limited.

In particular, by using the back distributor 47 to control the power take-off 3, the speed $n_{PTO}$ at the power take-off 3 can be set even to very small values, such as 2 rpm.

Furthermore, a shaft of the power take-off 3 which is intended to be connected to an implement can be rotated either in a preset direction or in the opposite direction. In other words, it is possible to reverse the speed $n_{PTO}$ at the power take-off 3.

When the engine 2 is turned off, the directional control valve 23 is displaced into the central position P3. The hydraulic pump 6 has a displacement equal to zero and the shaft of the power take-off 3 can be easily rotated by hand since the resistant torque is negligible in this condition.

The circuit shown in FIG. 2 can be used to brake the shaft of the power take-off 3 when the engine 2 is turned on, for safety reasons. To this end, the directional control valve 23 is moved to the central position P3 and the displacement of the hydraulic pump 6 is set to its maximum value. The clutch 13 is disengaged.

The torque generated by the hydraulic pump 6, when the latter tries to rotate, is enough to brake the slipping torque transmitted by the clutch 13.

It is thus ensured that the shaft of the power take-off 3 does not rotate if accidentally touched by an operator when the engine 2 is turned on and the power take-off 3 is not working.

During operation, the directional control valve 23 is either in the first position $P_1$ or in the second position $P_2$, in order to ensure that fluid circulates in the hydraulic motor 7 and the latter can be controlled. This feature of the circuit shown in FIG. 2 can be used to protect the shaft of the power take-off 3, as well as the corresponding clutch, from the peak torque which arises during the starting phases.

Basically, when it is desired to engage the power take-off 3, the directional control valve 23 is set in the central position $P_3$. In this position, the hydraulic motor 7 is braked only by the hydraulic resistance provided by the flow rate of the fluid passing through the ports K-K shown in FIG. 2. By properly dimensioning this flow rate, the hydraulic motor 7 can be put in rotation while avoiding transmission of peak torques to the power take-off 3. Then, the directional control valve 23 can be gradually displaced into either the first position $P_1$ or the second position $P_2$, while keeping the displacement of the hydraulic pump 6 equal to zero. Possible pressure peaks can be cut by the pressure control valves 31, 32.

By connecting the hydrostatic unit 5 to the auxiliary distributor via the joining ports H-H, the output shaft 15 and hence the shaft of the power take-off 3 can be driven directly by the hydraulic pump 6. To this end, the directional control valve 23 is displaced into the central position $P_3$ and a clutch interposed between the power take-off 3 and the output shaft 15 is disengaged. In this configuration, power at the power take-off 3 is limited by the available hydraulic power on the vehicle, but virtually any speed comprised between zero and an upper threshold or target speed of the power take-off 3 can be reached at the output shaft 15. This is due to the fact that, when the hydrostatic unit 5 is connected to the auxiliary distributor, speed of the output shaft 15 can be controlled by either acting on displacement of the hydraulic pump 6 or by means of the auxiliary distributor. In particular, when speed of the output shaft 15 is controlled by controlling displacement of the hydraulic pump 6, high rotation speeds at the output shaft 15 can be achieved. On the other hand, when speed of the output shaft 15 is controlled by means of the auxiliary distributor, low rotation speeds can be achieved at the power take-off 3, e.g. of 1 rpm. The rotation direction of the output shaft 15 can be both clockwise or counterclockwise. In other words, speed at the power take-off 3 can be reversed.

The vehicle having a transmission system as the one described with reference to FIGS. 1 and 2 can reach all the working points comprised between the lower line LL and the upper line UL in FIG. 3, which shows the range of speed values $n_{PTO}$ at the power take-off 3, as a function of the engine speed ω.

Figure 3:
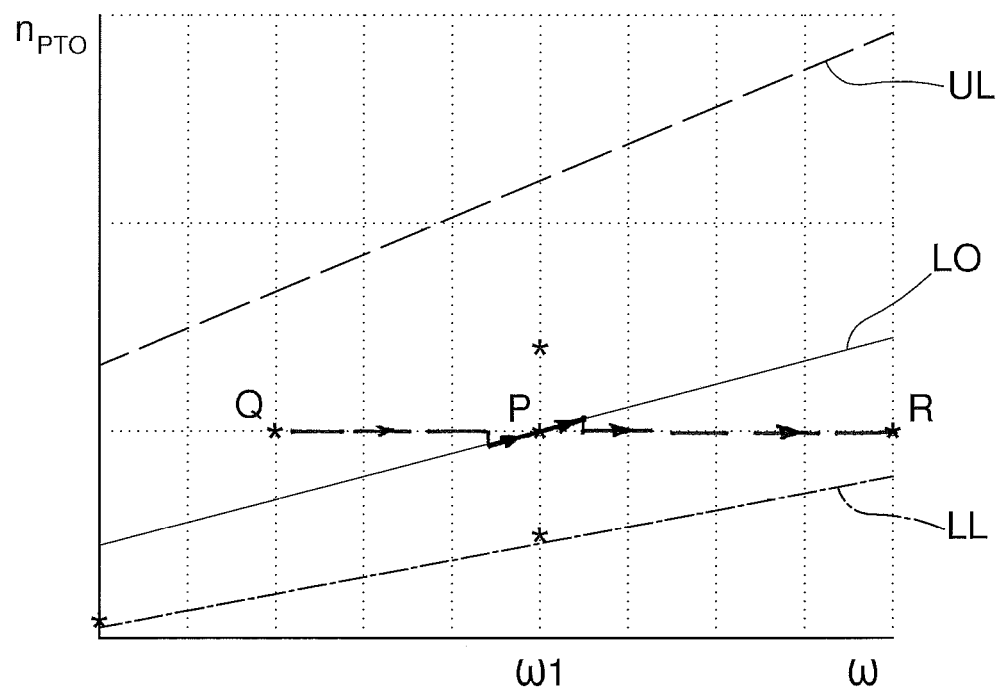
FIG. 3 is a diagram showing how the speed at a power take-off of the vehicle varies as a function of the speed of an engine powering the vehicle.

In the diagram of FIG. 3, the line L0 joins the points in which displacement of the hydraulic pump 6 is zero. In this situation, torque transmitted to the hydrostatic unit 5 is zero and the pump shaft 18 is stationary. Hence, all the torque generated by the engine 2 is transmitted—apart from internal losses—to the power take-off 3.

In particular, the working point P on the line L0 is a point in which the engine speed is at a value ω1 corresponding to the peak power supplied by the engine 2. In this condition, the hydrostatic unit 5 is not active and all power is transmitted to the power take-off 3. Power transmission at the power take-off 3 is therefore at its maximum efficiency.

Figure 4:
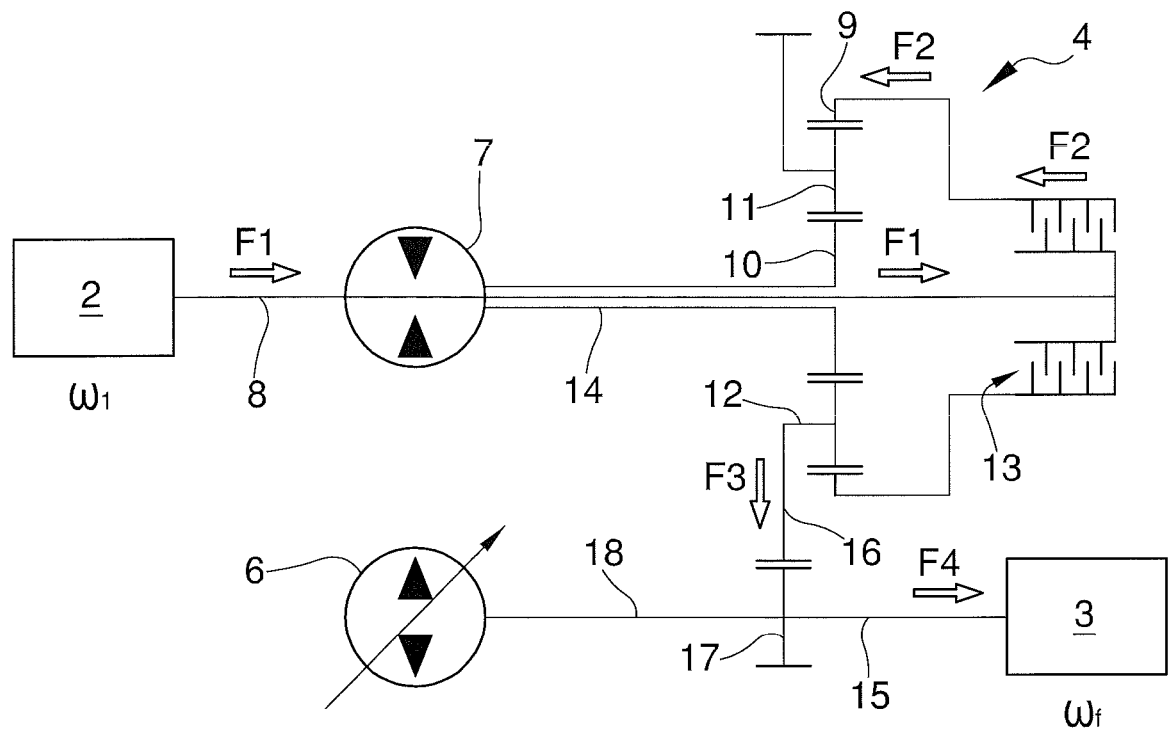
FIG. 4 is a view like FIG. 1, showing the transmission system in a first working condition.

This situation is also shown in FIG. 4, in which the engine 2, rotating at the speed ω1 corresponding to a peak power condition, transmits power to the first input shaft 8 as indicated by the arrows F1. The first input shaft 8 is thus rotated and, through the clutch 13, transmits power to the annular gear 9 of the planetary gear train 4, as indicated by the arrows F2.

The hydraulic pump 6 is in a condition of zero displacement, which means that the hydraulic pump 6 does not send any hydraulic fluid to the hydraulic motor 7. The second input shaft 14 is therefore stationary. Hence, the sun gear 10 of the planetary gear train does not rotate. The planet gears 11, which are driven by the annular gear 9, in turn move the carrier 12, which transmits power to the second gear 17 through the first gear 16, as indicated by the arrow F3. The output shaft 15 is hence rotated at a speed ωf and power is transmitted to the power take-off 3, as indicated by the arrow F4.

In the condition of FIG. 4, power is transmitted to the power take-off 3 with the highest efficiency, because the hydrostatic unit 5 is inactive and hence there are no power losses through the hydrostatic unit 5. This allows the loss of power in the transmission system 1 to be minimized.

In the working points above the line L0, the directional control valve 23 is generally in the first position P1, in which the first connection line 21 of the hydraulic motor 7 is connected to the first connection line 19 of the hydraulic pump 6, and the second connection line 22 of the hydraulic motor 7 is connected to the second connection line 20 of the hydraulic pump 6. The hydraulic motor 7 actually works as a motor and the hydraulic pump 6 works as a pump. Hence, the hydrostatic unit 5 generates power which adds to the power transmitted to the planetary gear train 4 by the engine 2 and increases speed at the power take-off 3. The displacement of the hydraulic pump 6 can be varied between 0 and +1, so as to keep constant or nearly constant the speed $n_{PTO}$ at the power take-off 3, independently of the engine speed ω.

Figure 5:
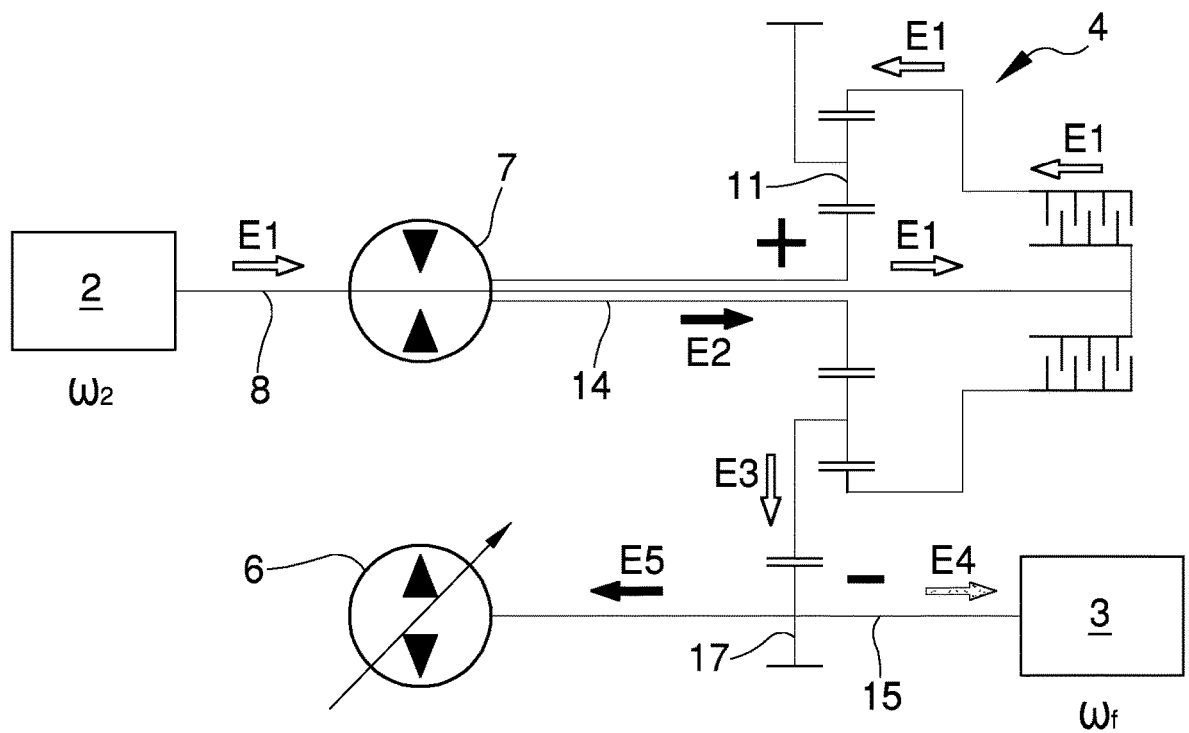
FIG. 5 is a view like FIG. 1, showing the transmission system in a second working condition.

An example of a working point above the line L0 is shown in FIG. 5, which shows a situation corresponding to the peak torque generated by the engine 2. In this situation, both the planetary gear train 4 and the hydrostatic unit 5 are active. In particular, the hydrostatic unit 5 increases speed of the output shaft 15 by adding power supplied by the hydraulic motor 7 to the power supplied by the engine 2. The speed of the output shaft 15 can therefore be kept constant at the value ωf.

In the situation of FIG. 5, the engine 2 rotates at a speed ω2 and transmits power to the first input shaft 8 and hence to the planetary gear train 4, as indicated by the arrows E1. Also the second input shaft 14 rotates and in turn transmits power to the planetary gear train 4, as indicated by the arrow E2. At the planet gears 11, power transmitted to the planetary gear train 4 by the first input shaft 8 adds up to the power transmitted to the planetary gear train 4 by the second input shaft 14. The planetary gear train 4 in turn transmits power to the second gear 17, as indicated by the arrow E3. A fraction E4 of power from the planetary gear train 4 goes to the power take-off 3, whereas a further fraction E5 of power goes to the hydraulic pump 6.

The output shaft 15 is thus rotated at the speed ωf.

In the working points below the line L0, the directional control valve 23 is generally in the second position $P_2$, in which the first connection line 21 of the hydraulic motor 7 is connected to the second connection line 20 of the hydraulic pump 6, and the second connection line 22 of the hydraulic motor 7 is connected to the first connection line 19 of the hydraulic pump 6. In this condition, the hydraulic pump 6 actually works as a motor, whereas the hydraulic motor 7 acts as a pump. The hydrostatic unit 5 takes away power from the power transmitted to the planetary gear train 4 by the engine 2 and decreases speed at the power take-off 3.

The displacement of the hydraulic pump 6 can be varied between 0 and +1, so as to keep constant or nearly constant the speed $n_{PTO}$ at the power take-off 3, independently of the engine speed ω.

Figure 6:
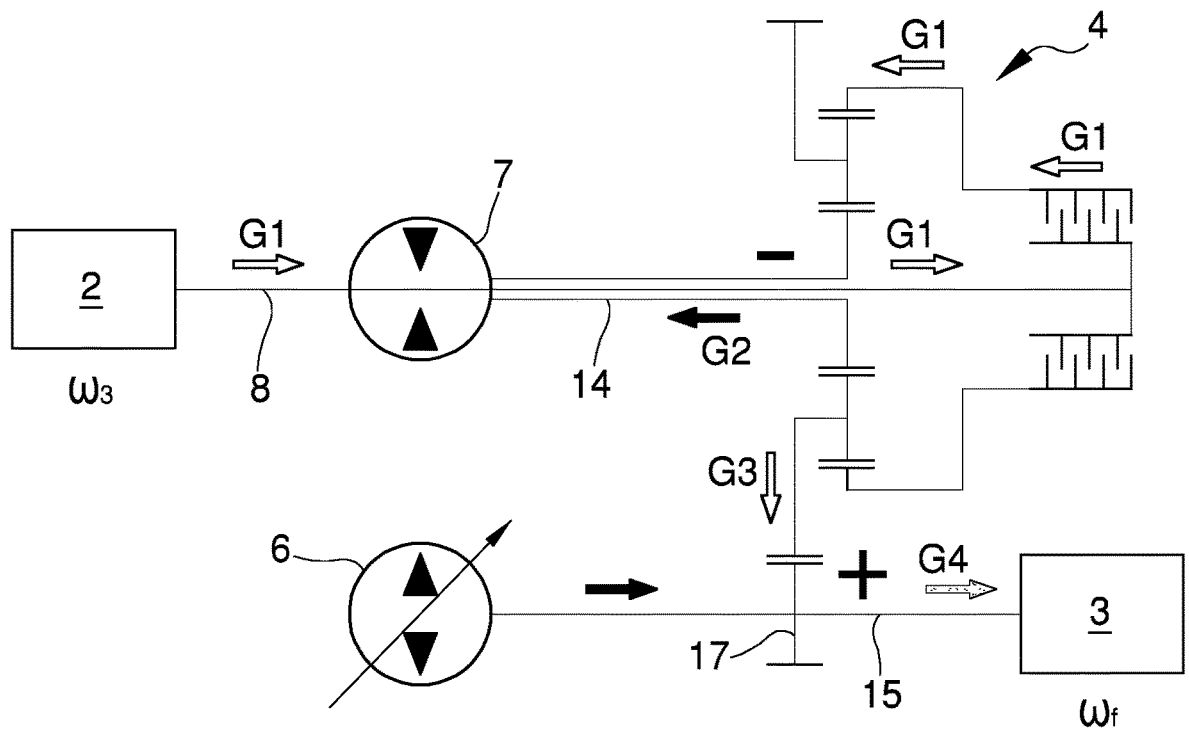
FIG. 6 is a view like FIG. 1, showing the transmission system in a third working condition.

FIG. 6 shows an example of a working condition below the line L0, in particular a situation corresponding to the rated speed of the engine 2, i.e. the maximum speed ω3 of the engine 2. In this situation, the hydrostatic unit 5 decreases speed of the output shaft 15 because the hydraulic motor 7 removes a fraction of power supplied by the engine 2. Once again, the speed of the output shaft 15 can be kept constant at the value ωf.

In the situation of FIG. 6, the engine 2 drives the first input shaft 8 and transmits power to the planetary gear train 4, as indicated by the arrows G1. The hydraulic motor 7 subtracts power from the power supplied by the engine 2, as indicated by the arrow G2. At the exit from the planetary gear train 4, the power resulting from the two contributions mentioned above is transmitted to the second gear 17, as indicated by the arrow G3. The second gear 17 in turn rotates the output shaft 15 at speed ωf, thereby transmitting power to the power take-off 3, as indicated by the arrow G4.

Figure 7:
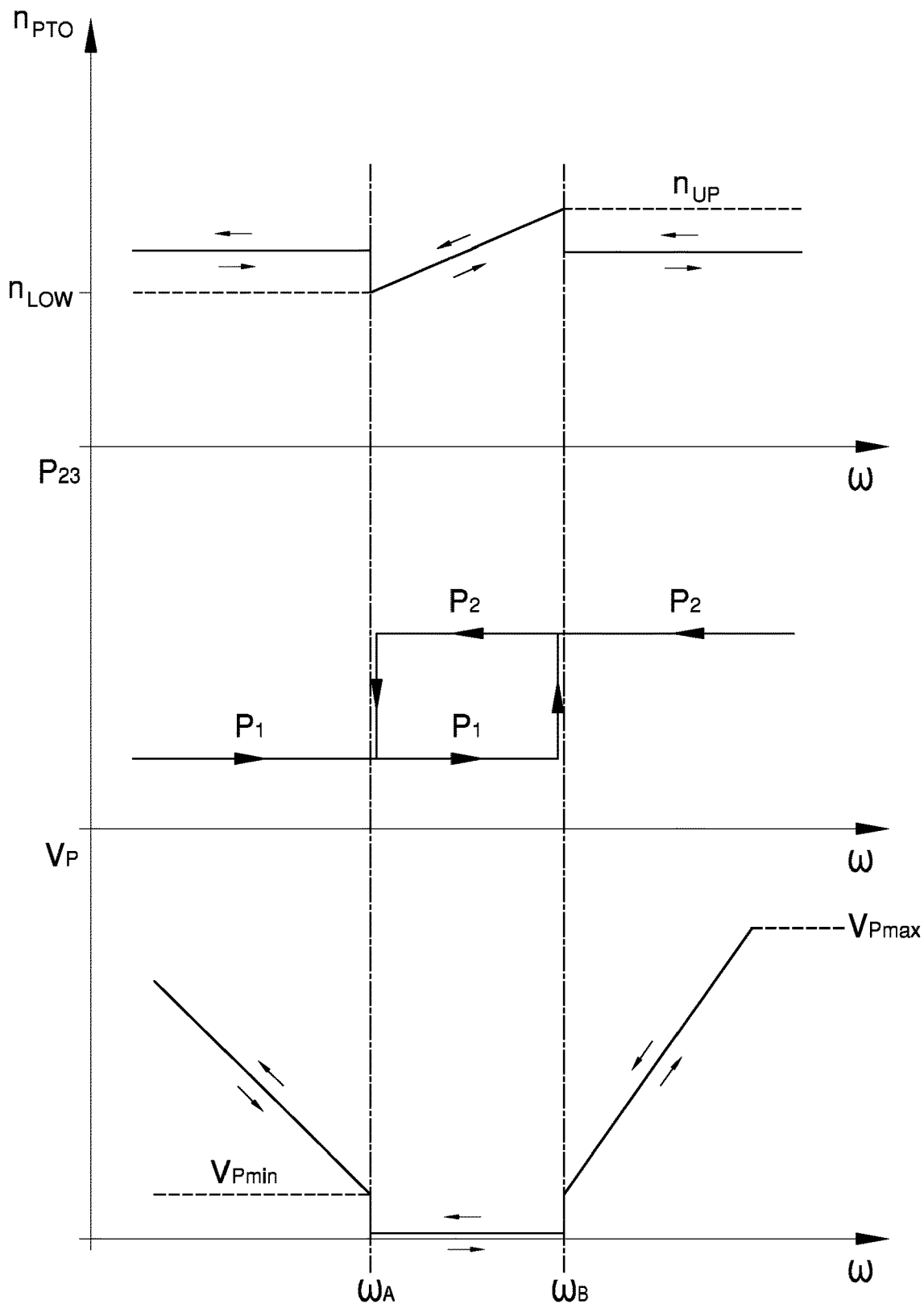
FIG. 7 is a diagram showing how the speed at the power take-off, displacement of a hydraulic pump of the transmission system and position of a valve of the transmission system vary as a function of the engine speed.

FIGS. 5-7 therefore correspond to three different working conditions in which power is distributed in different ways between the power take-off 3 and the hydraulic pump 7, but the speed at the power take-off 3 is always constant at the value ωf. This confirms that, owing to the transmission system 1, speed at the power take-off 3 can be controlled independently of the speed at the engine 2.

When there is the need to pass from a working condition above the line L0 to a working condition below the line L0 or vice versa, the directional control valve 23 has to switch from the first position $P_1$ to the second position $P_2$ or vice versa.

For example, it is supposed that the operator desires to increase the engine speed CO while keeping the speed $n_{PTO}$ at the power take-off 3 substantially constant, so as to pass from the working point Q to the working point R in FIG. 3. Theoretically, the displacement $V_P$ of the hydraulic pump 6 should decrease when moving from the working point Q to the working point P, reach a nil value at the working point P which is on the line L0, and then increase when moving from the working point P to the working point R. However, from a practical point of view, due to hydraulic leakages inside the hydraulic pump 6, controlling the displacement $V_P$ of the hydraulic pump 6 near a condition of zero displacement is a critical issue. In particular, the system might become unstable when the displacement $V_P$ of the hydraulic pump 6 is below a preset limit.

In order to prevent this, when there is the need to decrease the displacement $V_P$ of the hydraulic pump 6 down to a nil value and then increase it again, a control unit of the vehicle controls the hydraulic pump 6 so that, when a preset minimum value $V_{Pmin}$ of the displacement $V_P$ is reached, the displacement $V_P$ of the hydraulic pump 6 is automatically set to zero, as shown in the lower part of FIG. 7.

The displacement $V_P$ of the hydraulic pump 6 is kept equal to zero until a working condition is reached, which requires a theoretical displacement $V_P$ of the hydraulic pump 6 equal to the preset minimum value $V_{Pmin}$. At this point, the control unit sets the displacement VP of the hydraulic pump 6 at the preset minimum value $V_{Pmin}$, as shown in the lower part of FIG. 7. Thereafter, the displacement $V_P$ of the hydraulic pump 6 can be freely increased, according to the desired working conditions of the transmission system. If desired, the displacement $V_P$ of the hydraulic pump 6 can be increased until a preset maximum value $V_{Pmax}$ is reached.

As shown by the arrows in the lower part of FIG. 7, the same control logic is used when it is desired to decrease the displacement $V_P$ of the hydraulic pump 6 until a nil value is reached and then increase it again.

In FIG. 3, the control logic disclosed above corresponds to a path from the working condition Q to the working condition P which follows the arrows along the dashed line.

As a consequence of what has been discussed above, and as shown in the lower part of FIG. 7, the displacement $V_P$ of the hydraulic pump 6 is set to zero for a range of engine speed comprised between a first value ωA and a second value ωB.

As shown in the upper part of FIG. 7, this affects the speed $n_{PTO}$ at the power take-off 3, since the speed $n_{PTO}$ is no longer constant as the engine speed ω increases. In particular, when the displacement $V_P$ of the hydraulic pump 6 is set to zero and the engine speed is equal to the first value ωA, the speed $n_{PTO}$ at the power take-off 3 drops to a value $n_{LOW}$. Thereafter, the speed $n_{PTO}$ at the power take-off 3 increases until the displacement VP of the hydraulic pump 6 takes on again a positive value, which in the present case occurs when the engine speed is equal to the second value ωB. At this point, the speed $n_{PTO}$ at the power take-off 3, which has reached an upper value $n_{UP}$, drops again to the constant value it had before setting to zero the displacement $V_P$ of the hydraulic pump 6.

By properly choosing the minimum value $V_{Pmin}$ at which the displacement $V_P$ of the hydraulic pump 6 is set to zero, the variations of the speed $n_{PTO}$ at the power take-off 3 (i.e. the difference between $n_{LOW}$ and $n_{UP}$) can nevertheless be kept within acceptable tolerances.

The central part of FIG. 7 shows how the directional control valve 23 is controlled when the displacement $V_P$ of the hydraulic pump 6 is close to zero. In particular, the position $P_{23}$ of the directional control valve 23 is shown as a function of the engine speed ω.

In the range of engine speeds below the first value ωA, the directional control valve 23 is in the first position $P_1$ (or direct flow position). On the other hand, in the range of engine speeds above the second value ωB, the directional control valve 23 is in the second position $P_2$ (or crossed flow position).

However, starting from a working condition in which the directional control valve 23 is in the first position $P_1$, the directional control valve 23 is not switched from the first position $P_1$ to the second position $P_2$ as soon as the displacement $V_P$ of the hydraulic pump 6 is set to zero. The directional control valve 23 is left in the first position $P_1$ until the displacement $V_P$ of the hydraulic pump 6 is again increased from the nil value.

In particular, just before increasing the displacement $V_P$ of the hydraulic pump 6 to the minimum value $V_{Pmin}$, the directional control valve 23 is moved to the second position $P_2$, in which the directional control valve 23 remains as the displacement $V_P$ of the hydraulic pump 6 increases.

If, on the other hand, the directional control valve 23 is initially in the second position $P_2$ and the displacement $V_P$ of the hydraulic pump 6 decreases down to zero and then increases again, the directional control valve 23 is not switched to the first position $P_1$ as soon as the displacement $V_P$ of the hydraulic pump 6 reaches a nil value. As indicated by the arrows pointing to the left in the central part of FIG. 7, the directional control valve 23 remains in the second position $P_2$ until when the displacement $V_P$ of the hydraulic pump 6 is raised from zero to the minimum value $V_{Pmin}$ near the first value $\omega A$ of the engine speed. In particular, the directional control valve 23 is displaced from the second position $P_2$ to the first position $P_1$ a moment before the displacement $V_P$ of the hydraulic pump 6 is increased to the minimum value $V_{Pmin}$.

The status of the directional control valve 23 undergoes therefore a sort of hysteresis in the range of engine speeds comprised between $\omega A$ and $\omega B$.

This avoids instability of the system. In particular, the control logic disclosed above prevents the directional control valve 23 from switching repeatedly from the first position $P_1$ to the second position $P_2$ or vice versa when the transmission system works near the point at which the displacement $V_P$ of the hydraulic pump 6 should theoretically be equal to zero.

Figure 8:
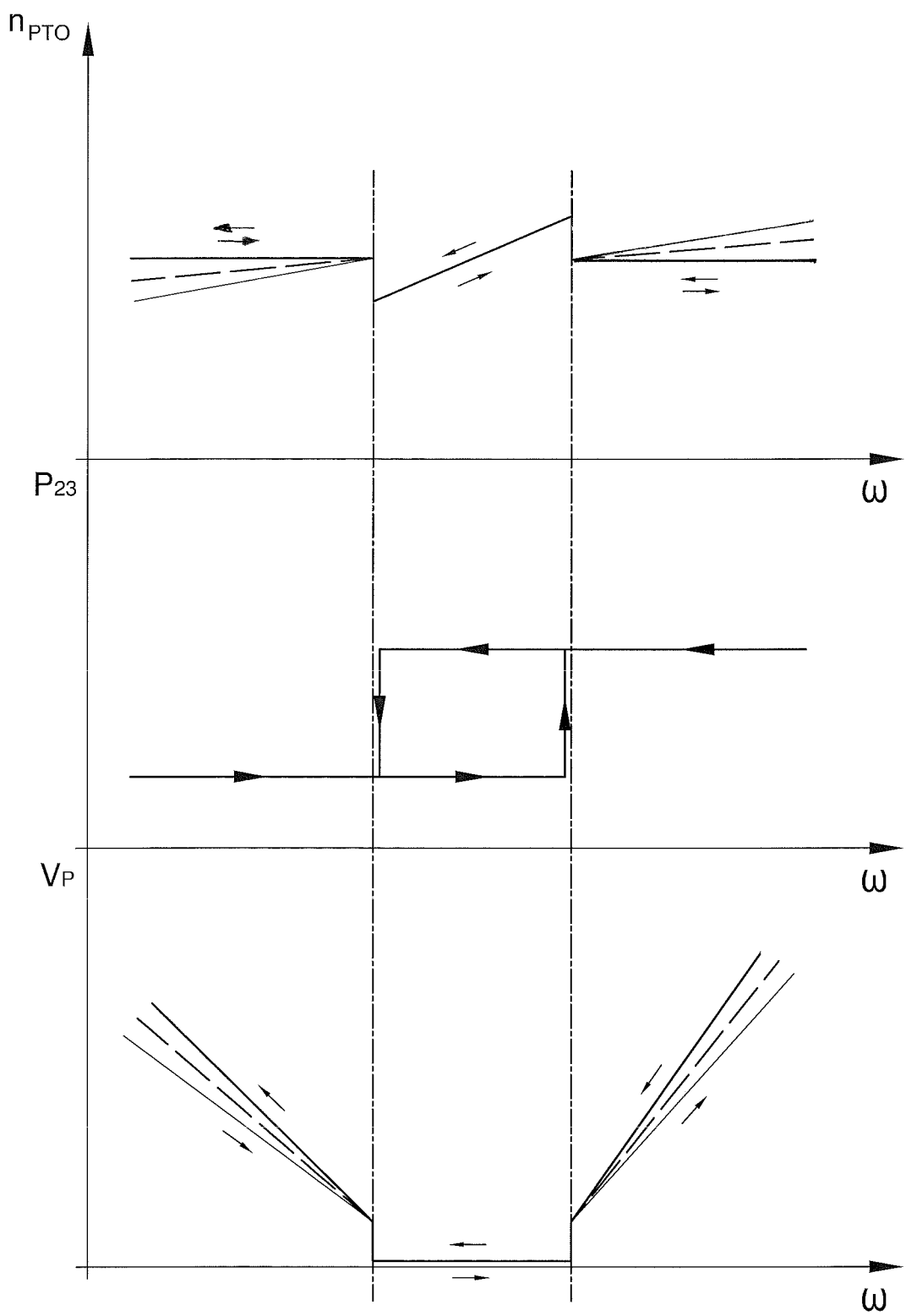
FIG. 8 is a diagram like FIG. 7, according to an alternative embodiment.

As shown in FIG. 8, an additional load sensing control of the speed $n_{PTO}$ at the power take-off 3 can be provided. In other words, the displacement $V_P$ of the hydraulic pump 6 can be properly varied in order to obtain a slow variation of the speed $n_{PTO}$ at the power take-off 3, depending on the engine speed.

If, for example, there is an increase in the load on an implement attached to the power take-off 3, power required at the power take-off 3 also increases. As a consequence, the engine speed $\omega$ would tend to decrease. In this case, it is possible to decrease the displacement $V_P$ of the hydraulic pump 6 in a controlled manner, so that also the speed $n_{PTO}$ at the power take-off 3 decreases, before the engine speed $\omega$ is reduced.

This allows a better control of the engine speed to be obtained. Furthermore, the operator may have a more precise feeling about what is occurring at the power take-off 3.

The speed $n_{PTO}$ at the power take-off 3 can be reduced to such an extent, that the engine speed $\omega$ remains substantially constant. This allows fuel consumption to be optimized.

In other words, it is either possible to keep speed $n_{PTO}$ at the power take-off 3 nearly constant and allow the engine speed $\omega$ to decrease, or to keep the engine speed $\omega$ substantially constant and decrease speed $n_{PTO}$ at the power take-off 3.

The control logic used for controlling displacement of the hydraulic pump 6 and position of the directional control valve 23 can also be used in a system which does not comprise a power take-off and/or a planetary gear train.

The invention claimed is:

1. A transmission system for transmitting power generated by an engine of a vehicle, comprising:
    a power take-off for driving an implement; and
    a hydrostatic unit for transmitting power from the engine to the power take-off, wherein the hydrostatic unit comprises:
        a first hydraulic power unit wherein the first hydraulic power unit is a hydraulic pump having a first connection line and a second connection line;
        a second hydraulic power unit wherein the second hydraulic power unit is a hydraulic motor having a first connection line and a second connection line;
        a valve for connecting the first hydraulic power unit and the second hydraulic power unit, the valve being positionable at least in a first position, in a second position and in a neutral position,
        wherein when the engine is turned off, the valve is displaced in the neutral position and displacement of the hydraulic pump is set to zero, thereby allowing a shaft of the power take-off to be rotated by hand.

2. The transmission system according to claim 1, wherein:
    in the first position, the first connection line and the second connection line of the first hydraulic power unit are connected respectively to the first connection line and to the second connection line of the second hydraulic power unit,
    in said second position, the first connection line and the second connection line of the first hydraulic power unit are connected respectively to the second connection line and to the first connection line of the second hydraulic power unit,
    in said neutral position, the first hydraulic power unit is disconnected from the second hydraulic power unit.

3. The transmission system according to claim 2, wherein, in the neutral position, the first connection line and the second connection line of the second hydraulic power unit are connected to each other and are isolated from the first connection line and from the second connection line of the first hydraulic power unit.

4. The transmission system according to claim 1, wherein the system further comprises a planetary gear train and a clutch for selectively coupling the engine to the planetary gear train, wherein when the engine is working and the power take-off is inactive:
    the valve is displaced in the neutral position,
    displacement of the hydraulic pump is set to a maximum value, and
    the clutch is disengaged.

5. The transmission system according to claim 1, wherein the displacement of the hydraulic pump is variable between zero and a maximum positive value in order to control speed at the power take-off independently of engine speed.

6. The transmission system according to claim 5, wherein the hydraulic pump is configured to be controlled so as to modify the displacement ($V_P$) of the hydraulic pump, to cause a speed at the power take-off to be modified responsive to a load acting on the power take-off.

7. The transmission system according to claim 1, further comprising a planetary gear train and a clutch for selectively coupling the engine to the planetary gear train.

8. The transmission system according to claim 1, wherein the valve comprises a distributor element, a first piloting valve and a second piloting valve being provided for controlling position of the distributor element, the first piloting valve and the second piloting valve being connectable by means of an input line to a supply circuit capable of supplying pressurized fluid in order to operate the first piloting valve and the second piloting valve, a further valve being provided for either isolating the input line from the supply circuit or connecting the input line to the supply circuit, the further valve being so controlled as to isolate the input line from the supply circuit when the power take-off is inactive, thereby allowing power to be saved.

9. The transmission system according to claim 8, further comprising a first position sensor and a second position sensor for determining position of the distributor element.

10. The transmission system according to claim 1, and further comprising a flashing valve interposed between the first connection line and the second connection line of the first hydraulic power unit for connecting to a discharge tank the line having the lowest pressure selected from between the first connection line and the second connection line of the first hydraulic power unit.

11. The transmission system according to claim 10, and further comprising a planetary gear train, a lubricating conduit branching from a conduit that connects the flashing valve to the discharge tank in order to deviate a portion of fluid passing through the conduit towards the planetary gear train, thereby lubricating a plurality of toothed wheels of the planetary gear train.

\* \* \* \* \*